US007697703B2

(12) United States Patent
Okabayashi et al.

(10) Patent No.: US 7,697,703 B2
(45) Date of Patent: Apr. 13, 2010

(54) DIGITAL MIXER APPARATUS

(75) Inventors: Masaaki Okabayashi, Hamamatsu (JP); Daisuke Takahashi, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 1027 days.

(21) Appl. No.: 10/802,494

(22) Filed: Mar. 16, 2004

(65) Prior Publication Data

US 2004/0184625 A1 Sep. 23, 2004

(30) Foreign Application Priority Data

Mar. 20, 2003 (JP) ............................. 2003-077819
Mar. 20, 2003 (JP) ............................. 2003-077820

(51) Int. Cl.
*H04B 1/00* (2006.01)
*G06F 17/00* (2006.01)
*H04B 1/20* (2006.01)

(52) U.S. Cl. ............................. 381/119; 700/94; 369/4

(58) Field of Classification Search ................. 381/119, 381/118; 369/4; 700/94
See application file for complete search history.

(56) References Cited

U.S. PATENT DOCUMENTS

2002/0107592 A1* 8/2002 Craig .......................... 700/94
2002/0156547 A1* 10/2002 Suyama et al. ................ 700/94
2002/0188364 A1* 12/2002 Ota et al. ...................... 700/94
2003/0059066 A1 3/2003 Kohyama et al.

OTHER PUBLICATIONS

02R96 Digital Mixing Console Owner's Manual, Yamaha Corporation, pp. 4-6, 15, 79-81 and block Diagram.

* cited by examiner

*Primary Examiner*—Vivian Chin
*Assistant Examiner*—George C Monikang
(74) *Attorney, Agent, or Firm*—Morrison & Foerster LLP

(57) ABSTRACT

While an AUX-bus selecting operator is being operated beyond a predetermined time period, displays of channel-ON operators, normally indicating ON/OFF states of corresponding input channels, indicate ON/OFF states of signal delivery from the input channels to the AUX bus. Thus, a user can readily confirm, with minimized operation, the ON/OFF states of the signal delivery from the input channels to the second bus. Operating any one of the channel-ON operators in this state can change the ON/OFF state of the signal delivery from the corresponding input channel to the AUX bus. Further, operating the AUX-bus selecting switch while keeping operating the layer operator, current fader settings of the input channels can be copied as delivery levels of signals from the input channels to the AUX bus. Because the delivery levels of sound signals from the input channels to the bus can be set using the fader settings of the input channels as initial values, time and labor necessary for the setting operation can be minimized.

3 Claims, 6 Drawing Sheets

DIGITAL MIXER APPARATUS

BACKGROUND OF THE INVENTION

The present invention relates to digital mixers for performing centralized control of audio equipment in sites where live concerts, live broadcasting, etc. are carried out.

The conventional mixers used in live concerts, live broadcasting, etc. are capable of mixing and outputting not only main sounds to be listened to by an audience but also motoring sounds to be supplied to individual performers. In a live concert, for example, the mixer mixes a plurality of performed sounds for the audience to output the mixed sounds to main speakers provided for the audience, but also mixes the same performed sounds for the individual performers to output the mixed results to monitoring speakers provided for the performers. Generally, the performed sounds to be included in the monitoring sounds and the performed sounds to be not included in the monitoring sounds normally differ between the individual performers. Therefore, for each of buses mixing the performed sounds for the performers, it has been conventional for a human operator of the mixer to make confirmation and necessary setting as to whether or not the performed sounds from individual input channels are to be input to that bus. For the confirmation and setting, the human operator calls a dedicated setting screen for each of the buses mixing the performed sounds for the performers.

For example, AUX (auxiliary) buses or the like are used to perform the mixing for the individual performers. Using the AUX-bus-specific dedicated setting screens as mentioned above, the human operator can set from which input channels and to which AUX buses performed sounds should be sent or delivered. AUX selecting switches are provided in corresponding relation to the AUX buses, for selecting any one of the AUX buses, i.e. for calling the setting screen of any one of the AUX buses. Namely, from which input channels performed sounds are to be sent to the buses (e.g., AUX buses) that mix the performer-by-performer monitoring sounds can be confirmed and set only via the respective dedicated screens of the buses, and such confirming and setting operation tends to be a very complicated one requiring considerable amounts of time and labor.

In the case where the AUX buses are used as the monitoring buses for the individual performers, send (or delivery) levels of signals to be delivered from the individual input channels to a given one of the AUX buses are set in accordance with a request of the performer listening to the monitoring sounds. It has been conventional to set the signal send levels, for example, by placing the AUX bus, to be used for the monitoring, in a selectable state, placing various setting items, related to the AUX bus, in a state settable via operators, such as faders and rotary encoders, provided on an operation panel and then appropriately manipulating these operators. The signal send levels can also be set on a predetermined separate screen that is displayed for making various settings related to the AUX bus. Also, it has been conventional to set sound signal levels of the individual input channels for mixing of the performer-by-performer monitoring sounds, independently of mixing of the main sounds for the audience. Namely, the human operator has to make all settings for the mixing of the performer-by-performer monitoring sounds from scratch (from nothing), independently of the mixing of the main sounds for the audience.

SUMMARY OF THE INVENTION

In view of the foregoing, it is an object of the present invention to provide a technique for allowing a human operator or user of a digital mixer to confirm and set, with simple operation, from which input channels sounds are to be input to a bus to be used, for example, for sound monitoring.

It is another object of the present invention to provide a technique for allowing a human operator or user of a digital mixer to set, with simple operation, levels of signals to be input from input channels to a mixing bus to be used, for example, for sound monitoring.

In order to accomplish the above-mentioned objects, the present invention provides a digital mixer apparatus for performing mixing processing on sound signals to output mixed sound signals, which comprises: a plurality of input channels each arranged to receive a sound signal; a plurality of buses each arranged to perform mixing processing on the sound signals input thereto from one or more of the plurality of input channels and thereby output mixed sound signals; a plurality of bus selecting operators provided in corresponding relation to the plurality of buses, each of the bus selecting operators selecting a corresponding one of the buses in response to operation thereof, a plurality of channel-specific send operators provided in corresponding relation to the plurality of input channels, each of the channel-specific send operators controlling a level of the sound signal to be delivered from a corresponding one of the input channels to the selected bus; a plurality of channel-ON operators provided in corresponding relation to the plurality of input channels, each of the channel-ON operators turning on/off the sound signal to be passed through a corresponding one of the input channels and having a display that displays a signal ON/OFF state of the corresponding input channel; a send ON/OFF section that turns on/off delivery (hereinafter also referred to as "send") of the sound signals from the input channels to the buses for each of combinations of the input channels and the buses; and a control section that, while any one of the plurality of bus selecting operators is being operated beyond a predetermined time period, causes the displays of the channel-ON operators to display ON/OFF states, in the send ON/OFF section, of the delivery of the sound signals from the input channels, corresponding to the channel-ON operators, to the bus corresponding to the operated bus selecting operator.

In the present invention thus arranged, by keeping operating any one of the bus selecting operators, a user of the mixer can confirm, via the respective displays of the channel-ON operators, the ON/OFF states of the delivery of the sound signals from the input channels to the bus corresponding to the operated bus selecting operator. Because the display-equipped channel-ON operators and bus selecting operators are components commonly employed in the conventionally-known digital mixer apparatus, there is no need to provide new operators and displays in order to practice the present invention.

In a preferred embodiment, there are employed two major types of buses: main mixing (MIX) buses for mixing main sounds to be listened to by an audience; and auxiliary mixing (AUX) buses for mixing monitoring sounds to be listened by individual performers. In an embodiment, by the user keeping operating the bus selecting operator corresponding to a desired AUX bus, the displays, attached to the channel-ON operators corresponding to the input channels, are caused to indicate from which input channels sound signals are being input to the AUX bus that mixes the monitoring signals to output the mixed monitoring signals. Thus, a user (e.g., performer) of the digital mixer can conveniently confirm, on sight (at a glance), of which input channels sounds are being monitored.

According to a second aspect of the present invention, there is provided a digital mixer apparatus for performing mixing processing on sound signals to output mixed sound signals, which comprises: a plurality of input channels each arranged to receive a sound signal; a plurality of buses each arranged to perform mixing processing on the sound signals input thereto from one or more of the plurality of input channels and thereby output mixed sound signals; a plurality of bus selecting operators provided in corresponding relation to the plurality of buses, each of the bus selecting operators selecting a corresponding one of the buses in response to operation thereof; a plurality of channel-specific send operators provided in corresponding relation to the plurality of input channels, each of the channel-specific send operators controlling a level of the sound signal to be sent from a corresponding one of the input channels to the bus selected via the bus selecting operator; a plurality of channel-ON operators provided in corresponding relation to the plurality of input channels, each of the channel-ON operators turning on/off the sound signal to be passed through a corresponding one of the input channels and having a display that displays a signal ON/OFF state of the corresponding input channel; a send ON/OFF section that turns on/off delivery of the sound signals from the input channels to the buses for each of combinations of the input channels and the buses; and a control section that, while any one of the plurality of bus selecting operators is being operated beyond a predetermined time period, changes, in response to operation of any one of the channel-ON operators, the ON/OFF state, in the send ON/OFF section, of the delivery of the sound signal from the input channel, corresponding to the operated channel-ON operator, to the bus corresponding to the operated bus selecting operator.

In the present invention thus arranged, keeping operating any one of the bus selecting operators can change the ON/OFF states of the delivery of the sound signals from the individual input channels to the bus corresponding to the operated bus selecting operator. In this case too, the display-equipped channel-ON operators and bus selecting operators are components commonly employed in the conventionally-known digital mixer apparatus, and thus there is no need to provide new operators and displays in order to practice the present invention.

According to a third aspect of the present invention, there is provided a digital mixer apparatus for performing mixing processing on sound signals to output mixed sound signals, which comprises: a plurality of input channels each arranged to receive a sound signal; a plurality of layer operators provided in corresponding relation to a plurality of layers provided by dividing the plurality of input channels into groups each comprising a predetermined number of the input channels, each of the layer operators selecting, in response to operation thereof, the predetermined number of the input channels belonging to a corresponding one of the layers; a first bus that performs mixing processing on the sound signals input thereto from selected ones of the plurality of input channels and thereby outputs mixed sound signals; a predetermined number of first level operators to which are allocated the predetermined number of the input channels selected via the layer operator, each of the first level operators adjusting, in response to operation thereof, delivery levels of the sound signals to be delivered from the input channels allocated thereto to the first bus; a plurality of second buses that perform mixing processing on the sound signals input thereto from selected ones of the plurality of input channels and thereby output mixed sound signals; a plurality of bus selecting operators provided in corresponding relation to the plurality of second buses, each of the bus selecting operators selecting a corresponding one of the second buses in response to operation thereof; a predetermined number of second level operators to which are allocated the predetermined number of the input channels selected via the layer operator, each of the second level operators adjusting, in response to operation thereof, delivery levels of the sound signals to be delivered from the input channels allocated thereto to the second bus selected via the bus selecting operator; and a control section that, in response to operation of any one of the plurality of bus selecting operators during continued operation of any one of the plurality of layer operators, copies, as the delivery levels, set via the second level operator, of the signals to be delivered from the predetermined number of the input channels set via the second level operator to the second bus corresponding to the operated bus selecting operator, the delivery levels, set via the first level operator, of the signals to be delivered from the predetermined number of the input channels, corresponding to the operated layer operator, to the first bus.

In the present invention thus arranged, by operating any one of the bus selecting operators while keeping operating any one of the layer operators, the delivery levels of the signals to be delivered from the input channels, corresponding to the operated layer operator, to the first bus, can be copied as the delivery levels of the signals to be delivered from the same input channels to the second bus corresponding to the operated bus selecting operator. Thus, the present invention can facilitate and simplify the level adjusting operation.

The present invention may be constructed and implemented not only as the apparatus invention as discussed above, but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which.

DETAILED DESCRIPTION OF THE EMBODIMENTS

Figure 1:
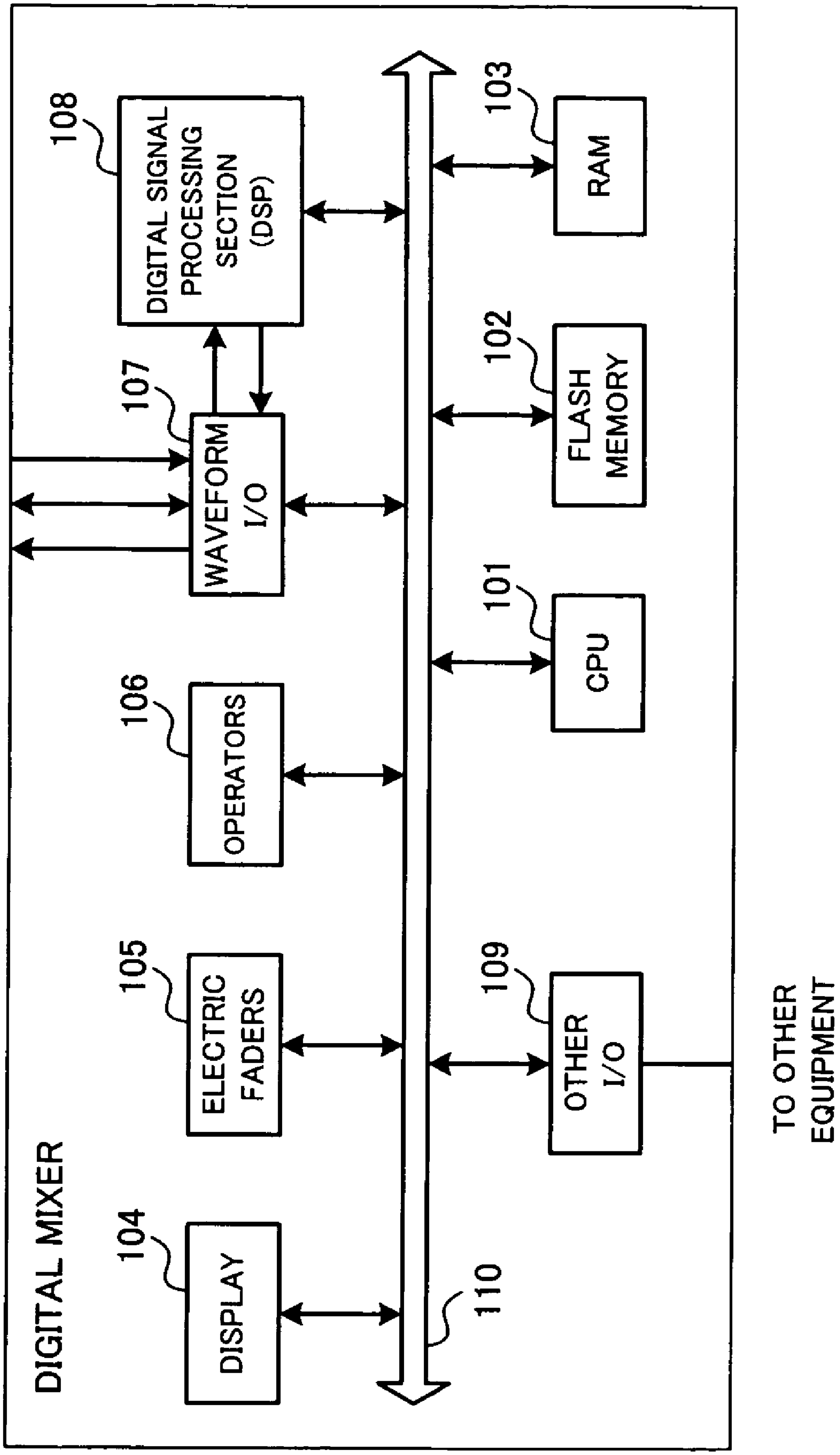
FIG. 1 is a block diagram showing an example hardware setup of a digital mixer in accordance with an embodiment of the present invention.

FIG. 1 is a block diagram showing an example hardware setup of a digital mixer in accordance with an embodiment of the present invention, which includes a central processing unit (CPU) 101, a flash memory 102, a random access memory (RAM) 103, a display 104, electric faders 105, operators 106, a waveform input/output interface (I/O) 107, a digital signal processing section (DSP) 108, another I/O 109 and a bus unit 110.

The CPU 101 controls operation of the entire digital mixer. The flash memory 102 is a non-volatile memory storing various programs to be executed by the CPU 101 and various data. The RAM 103 is a volatile memory used as a loading area for a program to be executed by the CPU 101 and working area for the CPU 101. The display 104 is provided on an external panel of the mixer for displaying various information as will be later described. The electric faders 105 are operators provided on the external panel for setting levels of signals, and the signal level settings made via the electric faders 105 are established in accordance with instructions from the CPU 101. Knobs of the electric faders 105 are electrically driven to respective positions corresponding to the settings. The operators 106 are various kinds of operators provided on the external panel for operation by the user. The waveform I/O 107 is an interface for communicating waveform signals with external equipment. The DSP 108 executes various microprograms on the basis of instructions given from the CPU 101 to thereby carry out mixing, effect impartment, volume level control and various other processes on waveform signals input via the waveform I/O 107, and the DSP 108 outputs the resultant processed waveform signals via the waveform I/O 107. The other I/O 109 is provided for connection between the digital mixer and other equipment.

Figure 2:
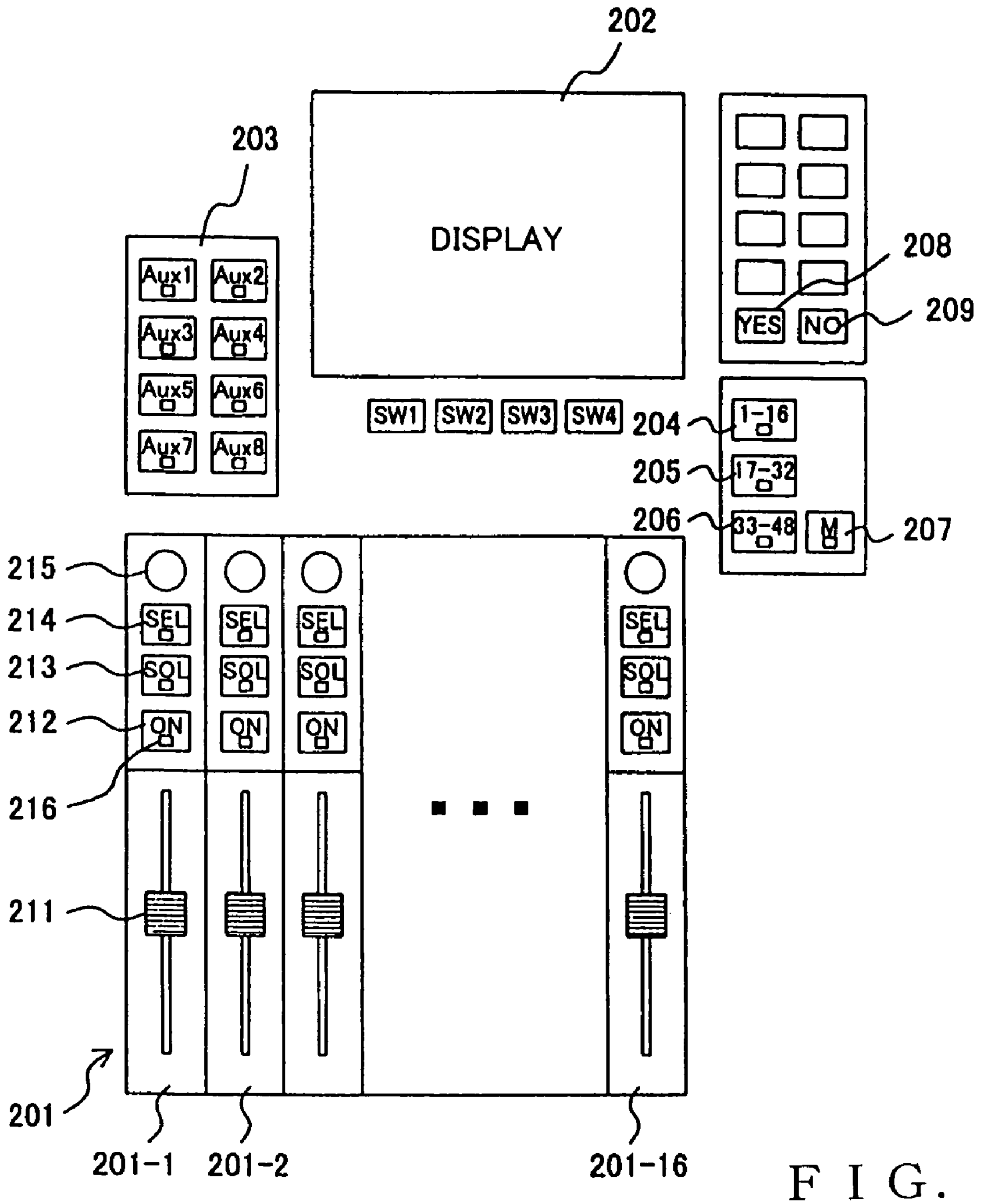
FIG. 2 is a diagram illustrating an outer appearance of an external panel of the digital mixer of FIG. 1.

FIG. 2 is a diagram illustrating an outer appearance of the external panel of the digital mixer of FIG. 1. In the figure, reference numeral 201 represents groups of operators allocated to the input channels; in the illustrated example, 16 operator groups 201-1-201-16 are allocated to the input channels. Each of the operator groups (hereinafter also called “channel strips”) includes a rotary encoder 215, SEL (i.e., selecting) switch 214, SOL (i.e., solo) switch 213, ch_ON switch 212, and electric fader 211. Around the rotary encoder 215, there are provided LED indicator elements that indicate a setting level designated by operation of the rotary encoder 215. In each of the switches 212-214, an LED 16 is provided for indicating an ON/OFF state of the function assigned to that switch. Reference numeral 202 represents a display for displaying various information.

AUX bus selecting switches 203 are provided for operation by a human operator (or user) of the mixer to select any desired one of the AUX buses 203. Specifically, the AUX bus selecting switches 203 are eight switches AUX1-AUX8 corresponding to eight AUX buses, and each of the switches AUX1-AUX8 includes an LED that is illuminated when the corresponding AUX bus is in a selected state. Only one of the AUX bus selecting switches 203 can be turned on at a time; namely, once one of the AUX bus selecting switches 203 is depressed, the LED of the depressed switch 203 is illuminated and the corresponding AUX bus is set to the selected state with all of the LEDs of the other seven AUX bus selecting switches deilluminated (the corresponding AUX buses set to the non-selected state).

The external panel of the digital mixer also includes layer switches 204 -206 for selecting input channels to be allocated to the operator groups 201. If the layer switch 204 is turned on, the sixteen channel strips 201-1-201-16 are caused to function as an operator group operable to make settings for the 1st to 16th input channels of the 48 input channels. Similarly, the layer switches 205 and 206 when turned on cause the channel strips 201-1-201-16 to function as operator groups to make settings for the 17th to 32nd input channels and 33rd to 48th input channels, respectively. The respective selected states for making settings for the 1st to 16th input channels, 17th to 32nd input channels and 33rd to 48th input channels are referred herein as “layers”. Reference numeral 207 represents a master switch. If the master switch 207 is depressed, the channel strip 201-1-201-8 are caused to function as an operator group to make settings for MIX output channels (308 of FIG. 3 to be later described), and the channel strip 201-9-201-16 are caused to function as an operator group to make settings for AUX output channels (309 of FIG. 3 to be later described). The external panel also includes a YES switch 208 and a NO switch 209. Each of the above-mentioned switches 204-207 includes an LED that is illuminated when the corresponding layer or master state is selected. Only one of the switches 204-206 and master switch 207 can be turned on at a time.

Figure 3:
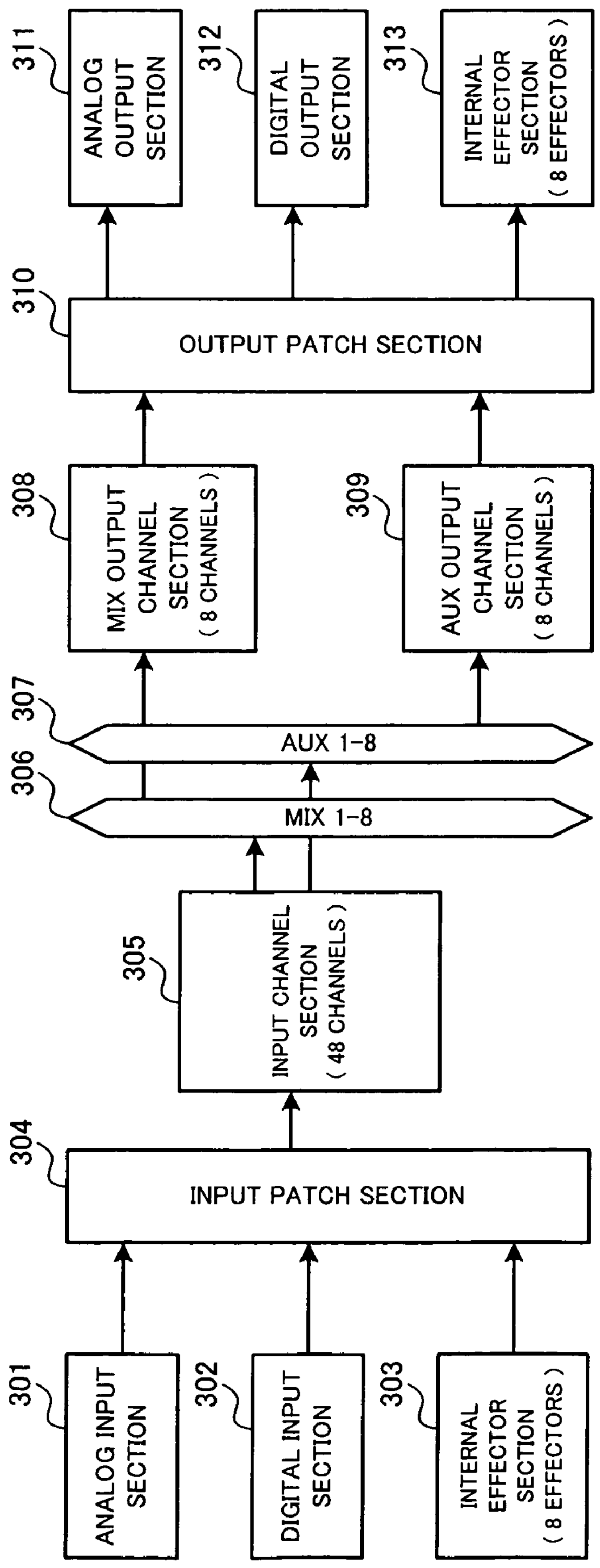
FIG. 3 is a functional block diagram focusing signal flows in the digital mixer of FIG. 1.

FIG. 3 is a functional block diagram focusing signal flows in the digital mixer of FIG. 1. Analog input section 301 receives signals from an analog-to-digital conversion input board that converts microphone and line signals into digital representation, and a digital input section 302 receives signals from a digital input board. Internal effector section 303 comprises eight effectors built in the digital mixer. Input patch section 304 connects the above-mentioned input sections to desired ones of the input channels (48 input channels) of an input channel section 305, in accordance with instructions given from the user while viewing a predetermined screen. Desired signals of the input channel section 305 can be selectively output to desired channels of a MIX bus section 306 (comprising eight MIX buses MIX1 -MIX 8) or AUX bus section 307 (comprising eight AUX buses AUX1-AUX 8). The MIX bus section 306 and AUX bus section 307 each mix signals input from the input channel section 305. The resultant mixed signals are output to corresponding MIX and AUX output channel sections 308 and 309. Outputs of the MIX and AUX output channel sections 308 and 309 are passed to an output patch section 310, which couples the outputs of the MIX and AUX output channel sections 308 and 309 to desired output sections. Analog output section 311 provides signals to a digital-to-analog conversion output board, and a digital output section 312 outputs signals to a digital output board. Internal effector section 313 imparts various effects to output signals and sends the effect-imparted signals back to the input-side effector section 303.

Figure 4:
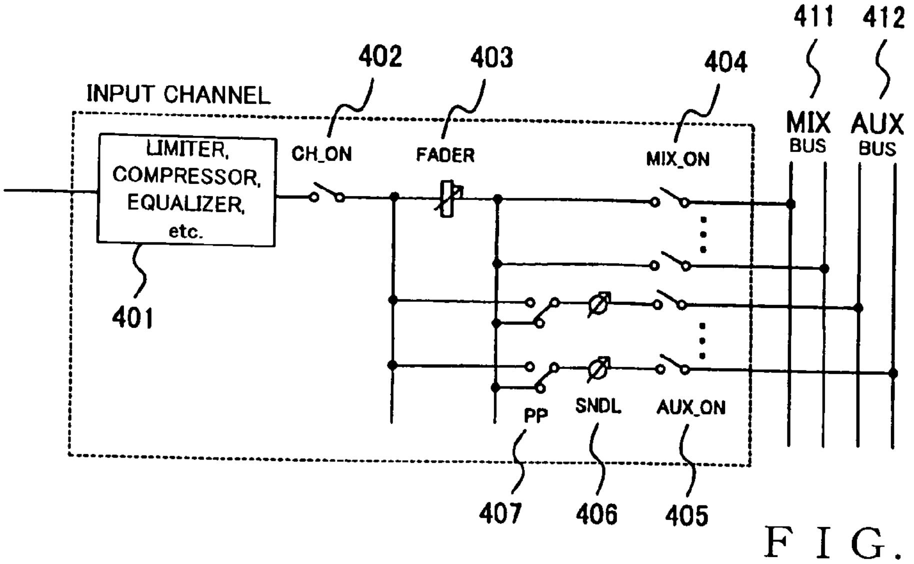
FIG. 4 is a diagram outlining part of a structure of an input channel section for one input channel.

FIG. 4 is a diagram showing a general structure of the input channel section 305 of FIG. 3 for one of the input channels. Reference numeral 401 represents a signal processing section including a limiter, compressor, equalizer (EQ), etc. CH_ON switch 402 is provided for turning on/off a signal output of the channel in question, and it corresponds to the ch_ON switch 212 of FIG. 2. FADER 403 corresponds to the electric fader 211 of FIG. 2. PP switches 407 are each provided for switching between a pre-fader position in which a signal to be output from the channel to an AUX bus 412 (307 of FIG. 3) is taken out from an input side of the fader 403 and a post-fader position in which the signal to be output is taken out from an output side of the fader 403. In practice, the PP switches 407 are not provided on the external panel shown in FIG. 2, and the function of such PP switches 407 is implemented by a screen as will be explained later in relation to FIG. 5A. SNDLs 406 are each a rotary encoder for adjusting a send (delivery) level of a signal that is to be sent to the AUX bus 412, and it corresponds to the rotary encoder 215 of FIG. 2. What the rotary encoder 215 of each of the channel strips controls is one of the plurality of rotary encoders SNDL 406 under control of the channel strip which is controlling the send level of an AUX bus having been selected by the AUX bus selecting switch 203. MIX_ON switches 404 are provided for setting which of the eight MIX buses 411 (306 of FIG. 3) the signal of the channel should be output to, and AUX_ON switches 405 are provided for setting which of the eight AUX buses 412 the signal of the channel should be output to.

Namely, in the illustrated example, the function of the CH_ON switch 402 of FIG. 4 is assigned to the ch_ON 212 of FIG. 2, the function of the FADER 403 to the electric fader 211, and the function of the SNDL 406 to the rotary encoder 215. However, the functions assigned to these operators can be changed by changing an operation mode of the mixer. For example, manipulation of a mode changing switch (not shown) can assign the function of the SNDL 406 to the electric fader 211 and assign the function of the FADER 403 to the rotary encoder 215. The following description will be made assuming that the functions are assigned in the manner set forth above in relation to FIG. 4. For understanding of change in the functions when the operation mode of the mixer has been changed, it is only necessary that the operators explained below be read as operators assigned in the new or changed operation mode.

Figure 5A:
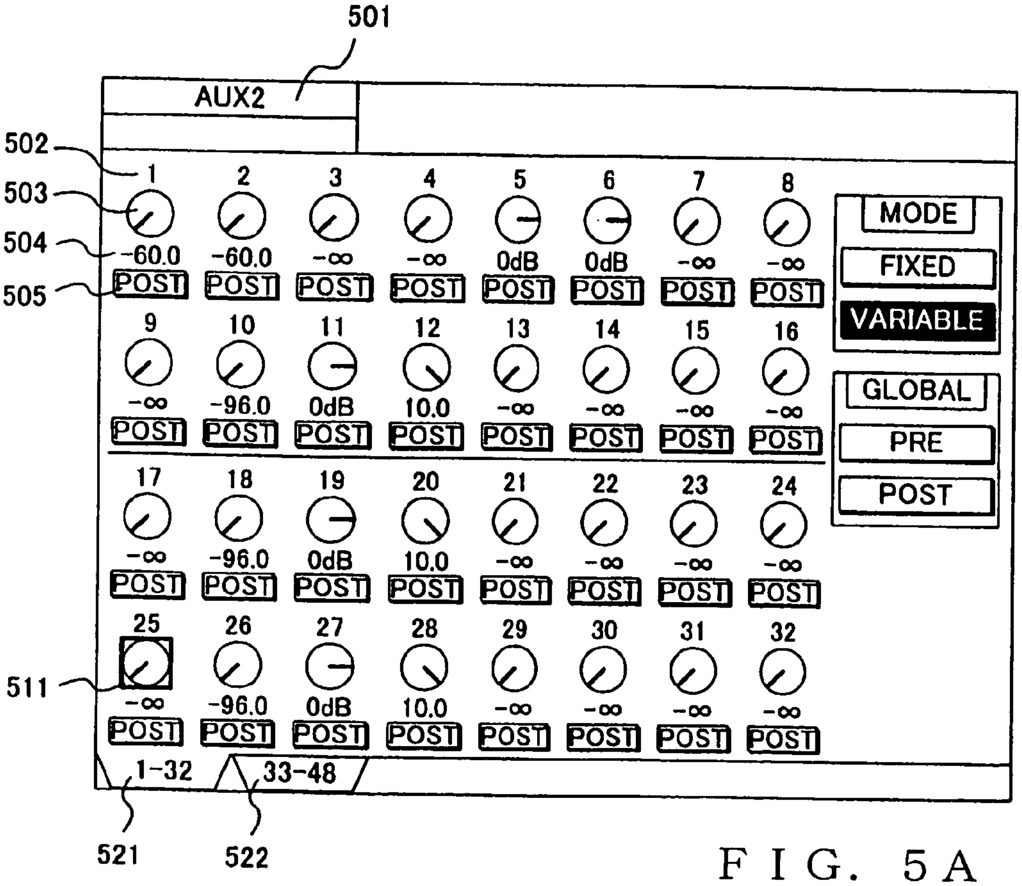
FIGS. 5A and 5B are diagrams showing an example of a screen displayed on a display when one of AUX bus selecting switches has been turned on, and an example of a message displayed in a mix-minus mode.

FIG. 5A shows an example of a screen displayed on the display 202 when one of the AUX bus selecting switches 203 has been turned on. "AUX 2" at the top of the screen indicates that the switch AUX 2 of the AUX bus selecting switches 203 has been depressed and is currently in the selected state with the LED of the switch AUX 2 illuminated or turned on. Reference numeral 502 represents respective channel numbers of the input channels from which signals are to be sent to the selected AUX bus. 503 and 504 represent send level settings of these input channels, i.e. setting values of the rotary encoders 215 of FIG. 2 and SNDLs 406 of FIG. 4. 505 represents settings of the PP switches407 of FIG. 4 in the input channels. "POST" indicates that the PP switches407 are currently set in the post-fader position; thus, if PP switches407 are in the pre-fader position, "PRE" is displayed at 505. Note that FIG. 5A shows the screen as displaying data at 502-504 for each of the 1st-32nd channels. Tabs 521 and 522 indicate for which one of the channel group of the 1st-32nd channels and the channel group of the 33rd-48th channels the screen display is currently performed. Display can be switched between the two channel groups by switches provided below the tabs 521 and 522. Further, 511 represents. a cursor, and the cursor 511 can be moved to the position of a desired one of the channels so that various settings can be made for the desired channel.

On the screen of FIG. 5A, the user can set send (deliver) levels with which signals of the individual input channels are sent or input to the AUX bus in question (send level setting), and set whether or not the signals are to be input to the AUX bus (ON/OFF setting). For example, when the cursor 411 is at the position of the 25th input channel ("25" on the screen) as illustrated in FIG. 5A, a displayed image 503 of the rotary encoder of the input channel can be turned and a displayed send level value of the input channel can be increased or decreased by the user operating an increment or decrement key (not shown). In this state, operating an enter key (not shown) can turn on/off the signal delivery or input to the AUX bus in a toggle-switch-like fashion. For example, when the signal input from the 25th input channel to the "AUX2" bus has been turned off, the image 503 of the rotary encoder of the 25th input channel is caused to fade (i.e., displayed in grey or caused to shade otherwise). Also, in the instant embodiment of the digital mixer, it is possible to readily set, for each of the AUX buses, from which input channels signals are to be input to the AUX bus, using only the switches on the external panel of FIG. 2 instead of using the screen of FIG. 5A; specifically, for this purpose, the AUX bus selecting switches 203 and ch_ON switch 212 are used. More specifically, when any one of the AUX bus selecting switches 203 is depressed, the AUX bus corresponding to the depressed switch 203 is shifted to the selected state so that the screen of FIG. 5A is displayed for the AUX bus. If the depression of the AUX bus selecting switch 203 has lasted for more than a predetermined time, i.e., if the AUX bus selecting switch 203 has been depressed beyond the predetermined time, then the ch_ON switches 212 of the individual input channels, normally performing the function of the CH_ON switches 402 of FIG. 4, are shifted to the function of the AUX_ON switches 405. Concurrently, the LEDs attached to the ch_ON switches 212 of the individual input channels are shifted from the ON/OFF display of the input channels over to the ON/OFF display of the AUX_ON switches 405 with respect to the selected AUX bus. Such an operation mode is referred to as a mix-minus mode.

Therefore, in setting, for a given AUX bus, which input channels are to be connected to the AUX bus for signal input to the AUX bus, the user continues to depress one of the AUX bus selecting switch 203, which corresponds to the given AUX bus, for more than a predetermined time to thereby place the mixer in the mix-minus mode and cause the LEDs of the ch_ON switches 212 to display current ON/OFF settings of the signal input from the individual input channels to the given AUX bus, under which conditions the user can operate the ch_ON switches 212 so as to set, as desired, ON/OFF of the signal input from the individual input channels to the given AUX bus. After that, once the human operator stops depressing the AUX bus selecting switch 203, the mix-minus mode is canceled, so that the ch_ON switches 212 of the individual input channels are restored to the original function of the CH_ON switches 402 of FIG. 4 and the LEDs attached to the ch_ON switches 212 of the individual input channels are brought back to the ON/OFF state display of the input channels.

Figure 5B:

FIG. 5B shows an example of a message displayed on the same row as the bottom tabs 521 and 522 of FIG. 5A when the mixer has been placed in the mix-minus mode. Specifically, in FIG. 5B, there is shown a message displayed when the "AUX2" switch selected from among the AUX bus selecting switches 203 has been depressed for more than (i.e., beyond) the predetermined time.

Note that, when any one of the layer switches 204-206 has been activated in the mix-minus mode so as to switch between the layers, i.e. select a new layer, the mix-minus mode becomes valid for that newly-selected layer. Of course, the layer switching operation via the layer switches 204-206 may be inhibited in the mix-minus mode. Further, the above-mentioned functions are provided only when any one of layer switches 204-206 is in the ON state. The mix-minus mode is not made valid even when any one of the AUX bus selecting switch 203 has been depressed more than the predetermined time with the master switch 207 kept on. If the master switch 207 is turned on in the mix-minus mode, the mix-minus mode is canceled. Further, if another AUX bus is selected by operation of any one of the AUX bus selecting switches 203 in the mix-minus mode, then the other AUX bus is newly set to the selected state with the mix-minus mode kept still valid; that is, the last selected AUX bus is given priority.

Further, the instant embodiment of the digital mixer has a function to readily copy current fader settings of the individual input channels (i.e., current settings of the FADERs of FIG. 4) as send levels of signals to be sent from the input channels to a selected AUX bus. Specifically, when the copying of the current fader settings is desired, the human operator or user depresses any one of the AUX bus selecting switches 203 with any one of the layer switches 204-206 depressed. Then, once the user turns on the YES switch 208 after a predetermined copying-instruction confirming message is displayed, the current fader values of the input channels of the layer corresponding to the depressed layer switch are copied as the send levels of signals to be sent from the input channels to the AUX bus corresponding to the depressed AUX bus selecting switch 203. At that time, the selected state of the AUX bus is not changed, so that the illumination state of the LED of the AUX bus selecting switch 203 is not changed.

Normally, what each performer wants to monitor is performed sounds of the other performers than that performer, and volume levels of the performed sounds to be monitored are based on volume levels of the performed sounds to be listened to by the audience. Where a given AUX bus is to be used for the monitoring purposes in the instant embodiment of the digital mixer, the user can readily set from which input channels sounds are to be sent to the given AUX bus, by merely operating the ch_ON switches 212 while depressing the corresponding AUX bus selecting switch 203 for the predetermined long time. Therefore, it is possible to readily turn off the signal input from each input channel that need not be monitored, such as the channel of sounds being performed by a particular performer, to the given AUX bus. Also, by depressing any one of the AUX bus selecting switches 203 while depressing any one of the layer switches 204-206, send levels of signals to be sent from the individual input channels of the selected layer to a MIX bus (i.e., levels of main sounds to be listened to by the audience) can be copied as the send levels of signals to be sent to the monitoring AUX bus; thus, the levels of the monitoring sounds can be readily set to the levels of the sounds to be listened to by the audience. Then, it is only necessary that, using such level settings as an adjustment basis, the send levels of signals to be sent to the monitoring AUX bus should be adjusted, in accordance with preference of the performer, only for a particular input channel requiring a level adjustment.

Now, a description will be given about various processes performed by the CPU 101 in order to provide the above-described functions.

Figure 6A:
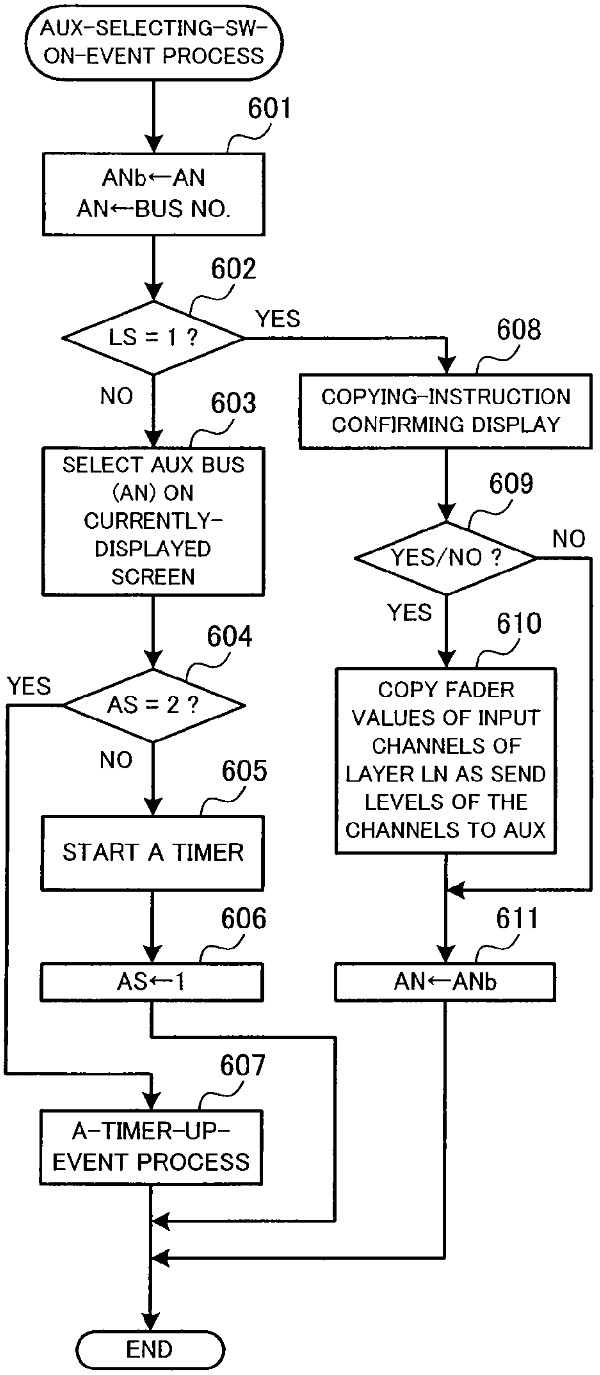
FIG. 6A is a flow chart of an AUX-selecting-switch-on-event process.

FIG. 6A is a flow chart of a process performed when there has occurred an ON event of any one of the AUX bus selecting switches 203. At step 601, an AUX bus number currently stored in a register AN is stored into a register ANb, and an AUX bus number (one of numbers "1"-"8") represented by the turned-on AUX bus selecting switch 203 is stored into the register AN. Then, at step 602, a determination is made as to whether a layer switch flag LS is currently set at a value "1". The layer switch flag LS is set at "1" when any one of the layer switches 204-206 is being depressed, and at "0" when none of the layer switches 204-206 is being depressed. If the register LS is not currently set at "1", the CPU 101 goes to step 603 in order to select one of the AUX buses (AUX bus numbers AN) on a currently-displayed screen and update the displayed screen. In this way, the screen pertaining to the selected AUX bus as illustratively shown in FIG. 5A is displayed. If the currently-displayed screen has no relation to the AUX bus whatsoever, then the displayed screen is left unchanged with no operation performed thereon.

Then, at step 604, a determination is made as to whether a currently-set value in a register AS is "2". The register AS is set at "0" when none of the AUX bus selecting switches 203 is being depressed, "1" when any one of the AUX bus selecting switches 203 is being depressed (but the predetermined time has not yet elapsed since the turning-on of the AUX bus selecting switch 203), and at "2" when the AUX bus selecting switch 203 has been depressed for more than the predetermined time (i.e., when the mix-minus mode is on). If the currently-set value in the register AS is not "2" as determined at step 604, the CPU goes to step 605 in order to initialize an A timer to initiate counting by the A timer. Then, the register AS indicating a current state of the A timer is set at "1" at step 606, upon which the process is brought to an end. The A timer is provided for detecting the predetermined long depression of the AUX bus selecting switch 203, i.e. that the AUX bus selecting switch 203 has been depressed for more than the predetermined time. If the currently-set value in the register AS is "2" as determined at step 604, it means that the AUX bus selecting switch 203 has been depressed for more than the predetermined time in the mix-minus mode, so that the CPU carries out an A-timer-up-event operation (see FIG. 6B) at step 607, which is the same as a process shown in FIG. 5B, in order to set the mix-minus mode for the newly-selected AUX bus. After step 607, the process is brought to an end.

If the layer switch flag LS is currently set at "1" as determined at step 602, it means that there has occurred an ON event of any one of the AUX bus selecting switches 203 during continued depression of any one of the layer switches 204-206, a copying-instruction confirming message is displayed at step 608. Then, once the YES switch 208 is turned on at step 609, the CPU goes to step 610 in order to copy current fader values of the individual input channels of the layer designated by the layer number LN as AUX send levels of the same input channels (i.e., send levels of signals to be send to the AUX bus of the bus number AN), after which the CPU proceed to step 611. The layer number LN takes a value "1" when the layer switch 204 (designating the 1st to 16th channels) is being depressed, a value "2" when the layer switch 205 (designating the 17th to 32nd channels) is being depressed and a value "3" when the layer switch 206 (designating the 33rd to 48th channels) is being depressed. The fader values of the individual input channels of the layer designated by such a layer number LN are copied. If the NO key has been depressed as determined at step 609, the CPU moves on to step 611 without copying the fader values. The bus number stored in the register ANb is returned to the register AN at step 611, upon which the process is brought to an end.

Figure 6B:
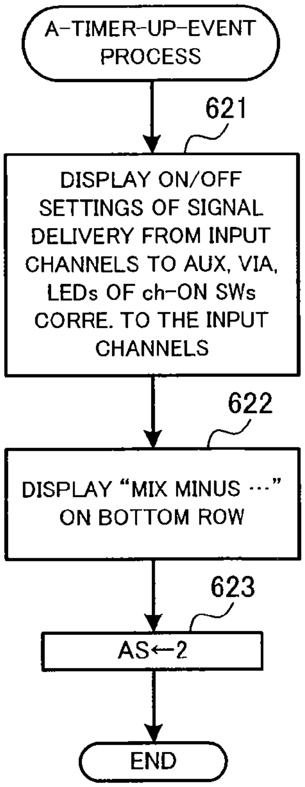
FIG. 6B is a flow chart of a timer-up-event process.

FIG. 6B is a flow chart of a process performed when there has occurred an A-timer-up event indicating that a predetermined time has elapsed since activation of the A timer. At step 621, current ON/OFF settings of the signal input (delivery) from the individual input channels of the currently-selected layer to the AUX bus of the bus number AN (i.e., settings of the AUX_ON switches 405 of FIG. 4) are displayed by illumination/deillumination of the LEDs of the ch_ON switches 212 corresponding to the input channels. At step 622, "MIX MINUS FOR AUX*" is displayed on the bottom row of the display 104 as illustrated in FIG. 5B. The position of the "*" mark is where the bus number AN is indicated. The value "2" is set into the register AS at step 623, and the process is brought to an end. By the process of FIG. 6B, the mixer is placed in the mix-minus mode.

Figure 6C:
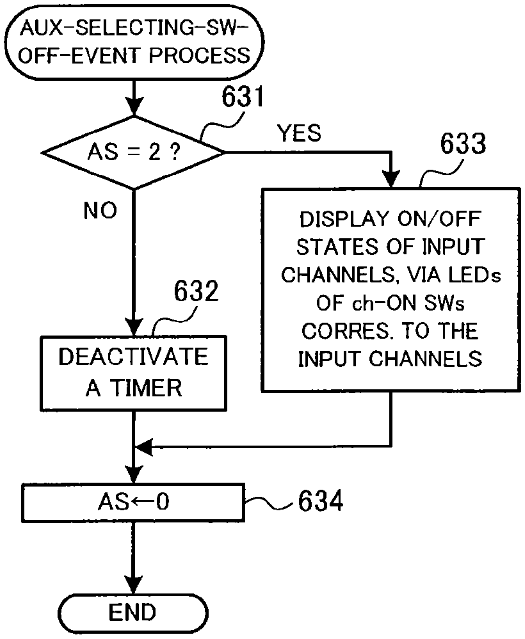
FIG. 6C is a flow chart of an AUX-selecting-switch-off-event process.

FIG. 6C is a flow chart of a process performed when there has occurred an OFF event of the AUX bus selecting switch 203. If the register AS is not currently set at "2" as determined at step 631, it means that the OFF event has occurred before the A timer reaches its predetermined count, so that the A timer is deactivated at step 632 and the AS register is initialized to "0" at step 634. After that, the process is brought to an end. If the register AS is currently set at "2", it means that the current operation mode is the mix-minus mode, so that the CPU proceeds to step 633, where the current ON/OFF states of the individual input channels of the currently-selected layer are displayed by the LEDs of the ch_ON switches 212 corresponding to the input channels. Then, the CPU proceeds to step 634.

Figure 7A:
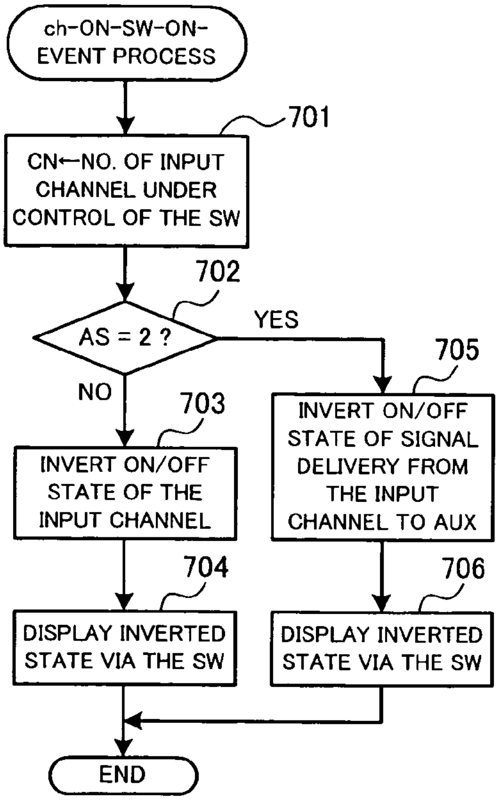
FIG. 7A is a flow chart of a ch-ON-switch-on-event process.

FIG. 7A is a flow chart of a process performed when there has occurred an ON event of any one of the ch_ON switches 212. At step 701, the channel number of the input channel currently under control of the turned-on ch_ON switch (i.e., one of the channels of the currently-selected layer which corresponds to the turned-on ch_ON switch) is set to the register CN. If the register AS is not currently at "2" as determined at step 702, the CPU goes to step 703 in order to invert the ON/OFF state of the input channel of the channel number CN (402 of FIG. 4). The thus-inverted state is displayed via the LED of that input channel at step 704, upon which the process is brought to an end. If the register AS is currently at "2" as determined at step 702, it means that the current operation mode is the mix-minus mode, so that the current ON/OFF state of the signal delivery from the input channel of the channel number CN to the AUX bus of the bus number AN is inverted at step 705 and the inverted ON/OFF state is displayed via the LED of that input channel at step 706, upon which the process is brought to an end.

Figure 7B:
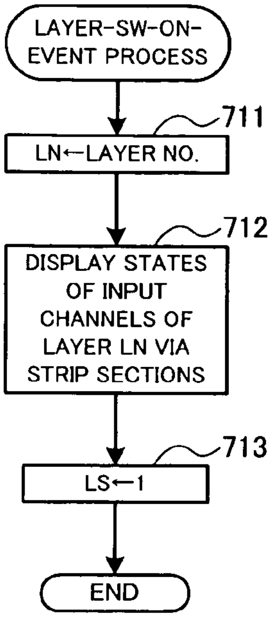
FIG. 7B is a flow chart of a layer-switch-on-event process.

FIG. 7B is a flow chart of a process performed when there has occurred an ON event of any one of the layer switches 204-206. At step 711, the layer number corresponding to the turned-on layer switch is stored into the register LN. At next step 712, respective current states of the input channels belonging to the layer of the layer number LN are indicated via the corresponding channel strip sections. Then, the layer switch flag LS is set at "1", upon which the process is brought to an end. If the occurrence of the ON event of any one of the layer switches 204-206 is in the mix-minus mode, the mix-minus mode is adjusted for the newly-selected layer. For this purpose, the current ON/OFF settings of the signal delivery from the individual input channels of the currently-selected layer to the AUX bus of the bus number AN are displayed by illumination/deillumination of the LEDs of the ch_ON switches 212 corresponding to the input channels.

Figure 7C:
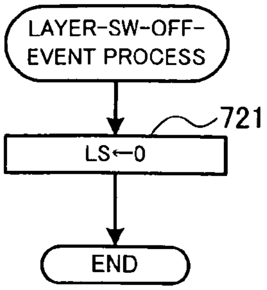
FIG. 7C is a flow chart of a layer-switch-off-event process.

Further, FIG. 7C is a flow chart of a process performed when there has occurred an OFF event of any one of the layer switches 204-206. At step 721, the AS register is initialized to "0", and then the process is brought to an end.

The preferred embodiment has been described above as performing the function of copying the current fader values of the individual input channels as the send levels of signals to be sent to the AUX bus, by the user depressing any one of the AUX bus selecting switches 203 while depressing any one of the layer switches 204-206. Such a copying function may be performed only when the PP switches 407 of FIG. 4 are set in the pre-fader position. This is because performing this function when the PP switches 407 of FIG. 4 are in the post-fader position will lead to dual signal level attenuation at the FADERs 403 and SNDLs 406 of FIG. 4. Whether the copying function should be performed when the PP switches are in the pre-fader position or when the PP switches are in the post-fader position can be set independently for each of the input channels, and thus the copying may be effected only for each input channel set to the pre-fader state without being effected for each input channel set to the post-fader state. For each post-fader input channel, a predetermined reference value may be set as the value of the SNDL 406 without the current fader value being copied as the signal send level.

Further, the preferred embodiment has been described in relation to the ON/OFF states of the signal input from the input channels to the AUX bus and the copying of the signal send levels, the basic principles of the present invention may be applied to any other types of buses than the AUX bus. Further, the basic principles of the present invention may be applied to mixers where the MIX buses and the AUX buses are not distinguished from each other. Furthermore, the predetermined long depression time, for which any one of the bus selecting switches has to be depressed to shift the operation mode to the mix-minus mode, may be set to any desired time length.

As has been described so far, the present invention is characterized in that, during the time that any one of the second-bus selecting operators is being operated beyond the predetermined time period, the displays of the channel-ON operators (normally indicating ON/OFF states of the corresponding channels) are caused to display the ON/OFF states of the delivery of the sound signals from the input channels, corresponding to the channel-ON operators, to the second bus (e.g., AUX bus). Thus, the user of the inventive mixer can readily confirm, with minimized operation, the ON/OFF states of the sound signal delivery from the input channels to the second bus. Further, because the display is switched only after lapse of the predetermined time from the turning-on of the bus selecting operator, rather than being switched instantly in response to the turning-on, the display can be prevented from undesirably flickering during normal bus selecting operation. Further, in the inventive digital mixer apparatus, where operation of any one of the channel-ON operators in such a state can change the ON/OFF state of the sound signal delivery from the corresponding input channel to the second bus, it is possible to readily set, with minimized operation, the ON/OFF states of the sound signal delivery to the second bus.

Further, in the present invention, simple operation of operating any one of the bus selecting operators while keeping operating any one of the layer operators, the delivery (send) levels of the signals to be delivered from the input channels to the first bus (e.g., MIX bus) can be readily copied as the delivery levels of the signals to be delivered from the same input channels to the second (i.e., AUX) bus. Therefore, in the case where the second bus is used, for example, for monitoring purposes, the delivery levels of sound signals from the input channels, which receive main sounds to be listened to by the audience, can be readily copied as initial values of the delivery levels of the sound signals to be delivered from the input channels to the monitoring bus, so that the present invention can significantly reduce the time and labor necessary for the setting operation.

What is claimed is:

1. A digital mixer apparatus for performing mixing processing on sound signals to output mixed sound signals, said apparatus comprising:

a plurality of input channels each arranged to receive a sound signal;

a first bus and a plurality of second buses each arranged to perform mixing processing on the sound signals input thereto from one or more of said plurality of input channels and thereby outputting mixed sound signals;

a plurality of bus selecting controls provided in one-to-one corresponding relation to said plurality of second buses, each of said bus selecting controls selecting a corresponding one of said second buses in response to operation thereof;

a plurality of channel-specific send controls provided in corresponding relation to said plurality of input channels, each of said channel-specific send controls controlling a send level of the sound signal to be delivered from a corresponding one of said input channels to the selected bus;

a plurality of channel-ON controls provided in corresponding relation to said plurality of input channels, each of said channel-ON controls setting a signal ON/OFF state whether or not the sound signal is passed through each of said input channels corresponding to each of said channel-ON controls and inputs to the first bus, each of said channel-ON controls having a display that displays the signal ON/OFF state of the corresponding input channel;

a send ON/OFF section that sets send ON/OFF states whether or not to permit delivery of the sound signals from said input channels to said second buses for each of combinations of said input channels and said second buses; and a control section that, while any one of said plurality of bus selecting controls is being operated beyond a predetermined time period, causes the displays of said channel-ON controls to display the send ON/OFF states, in said send ON/OFF section, of the delivery of the sound signals from the input channels, corresponding to said channel-ON controls, to the second bus corresponding to the one bus selecting control, instead of displaying the signal ON/OFF states of the input channels.

2. A digital mixer apparatus for performing mixing processing on sound signals to output mixed sound signals, said apparatus comprising:

a plurality of input channels each arranged to receive a sound signal;

a first bus and a plurality of second buses each arranged to perform mixing processing on the sound signals input thereto from one or more of said plurality of input channels and thereby outputting mixed sound signals;

a plurality of bus selecting controls provided in one-to-one corresponding relation to said plurality of second buses, each of said bus selecting controls selecting a corresponding one of said second buses in response to operation thereof;

a plurality of channel-specific send controls provided in corresponding relation to said plurality of input channels, each of said channel-specific send controls controlling a send level of the sound signal to be sent from a corresponding one of said input channels to the bus selected via said bus selecting control;

a plurality of channel-ON controls provided in corresponding relation to said plurality of input channels, each of said channel-ON controls setting a signal ON/OFF state whether or not the sound signal is passed through each of said input channels corresponding to each of said channel-ON controls and inputs to the first bus, each of said channel-ON controls having a display that displays the signal ON/OFF state of the corresponding input channel;

a send ON/OFF section that sets send ON/OFF states whether or not to permit delivery of the sound signals from said input channels to said second buses for each of combinations of said input channels and said second buses; and a control section that, while any one of said plurality of bus selecting controls is being operated beyond a predetermined time period, changes, in response to operation of any one of said channel-ON controls, the send ON/OFF state, in said send ON/OFF section, of the delivery of the sound signal from the input channel, corresponding to the one channel-ON control, to the second bus corresponding to the one bus selecting control, instead of changing the signal ON/OFF states of the input channels corresponding to the one channel-ON control.

3. A digital mixer apparatus for performing mixing processing on sound signals to output mixed sound signals, said apparatus comprising:

a plurality of input channels each arranged to receive a sound signal;

a plurality of layer controls provided in one-to-one corresponding relation to a plurality of layers provided by dividing said plurality of input channels into groups each comprising a predetermined number of the input channels, each of said layer controls selecting, in response to operation thereof, the predetermined number of the input channels belonging to a corresponding one of said layers;

a first bus that performs mixing processing on the sound signals input thereto from selected ones of said plurality of input channels and thereby outputs mixed sound signals;

a predetermined number of first level controls to which are allocated the predetermined number of the input channels selected via said layer controls, each of said first level controls adjusting, in response to operation thereof, first delivery levels of the sound signals to be delivered from the input channels allocated thereto to said first bus;

a plurality of second buses that perform mixing processing on the sound signals input thereto from selected ones of said plurality of input channels and thereby output mixed sound signals;

a plurality of bus selecting controls provided in one-to-one corresponding relation to said plurality of second buses, each of said bus selecting controls selecting a corresponding one of said second buses in response to operation thereof;

a predetermined number of second level controls to which are allocated the predetermined number of the input channels selected via said layer controls, each of said second level controls adjusting, in response to operation thereof, second delivery levels of the sound signals to be delivered from the input channels allocated thereto to said second bus selected via said bus selecting control; and a control section that, in response to operation of any one of said plurality of bus selecting controls during continued operation of any one of said plurality of layer controls, copies, the second delivery levels of the signals to be delivered from the predetermined number of the input channels to said second bus corresponding to the one bus selecting control, from the first delivery levels, set via said first level controls, of the signals to be delivered from the predetermined number of the input channels, corresponding to the one layer control, to said first bus.

* * * * *